United States Patent Office 3,196,055
Patented July 20, 1965

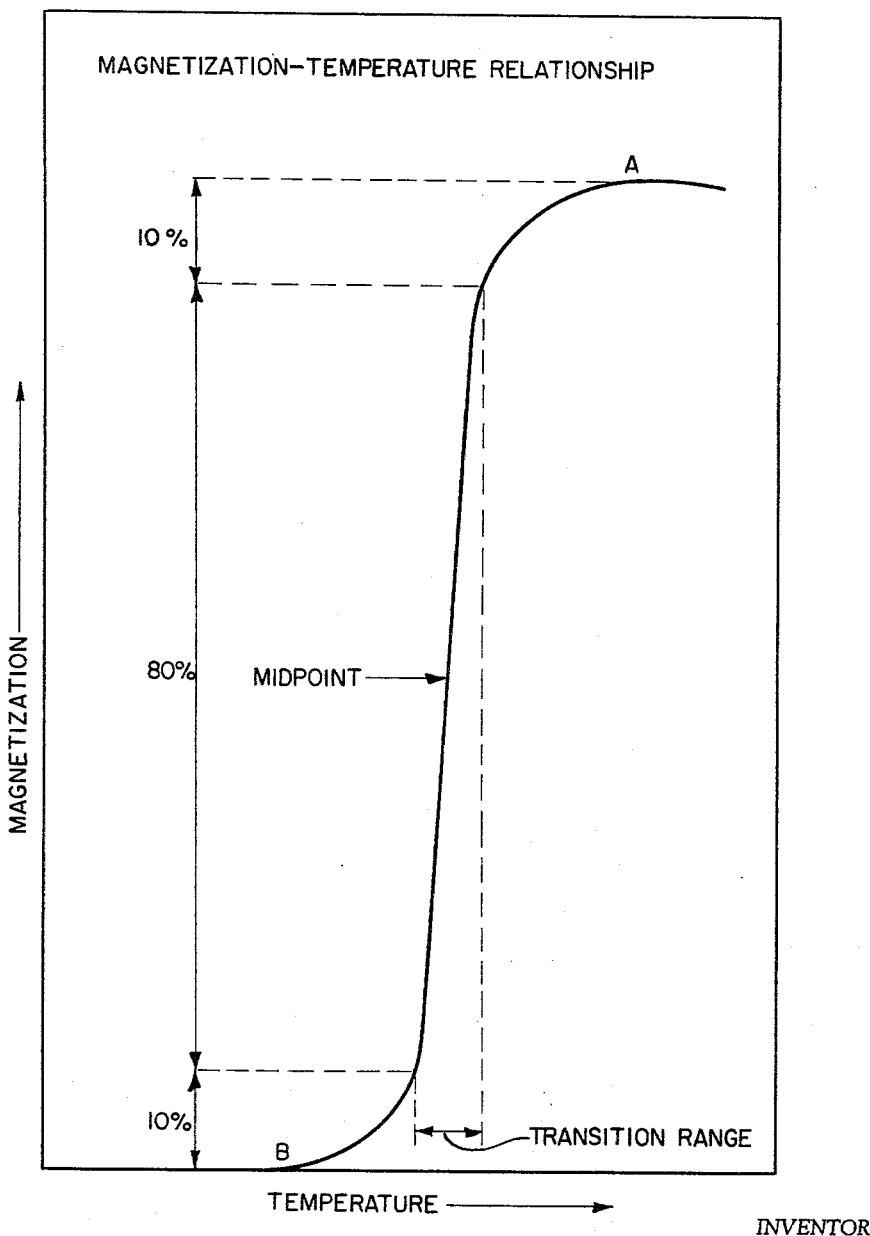

3,196,055
SHARP TRANSITION EXCHANGE INVERSION COMPOSITION AND A METHOD OF MAKING IT
Walter W. Gilbert, Hockessin, Del., assignor to E. I. du Pont de Nemours and Company, Wilmington, Del., a corporation of Delaware
Filed June 29, 1961, Ser. No. 120,679
10 Claims. (Cl. 148—121)

This invention relates to magnetic compositions exhibiting an increase in saturation induction with rise in temperature within a selected temperature range. More particularly, this invention relates to magnetic compositions for which an increase in saturation induction with rise in temperature occurs rapidly over a narrow temperature range and to methods for preparing such compositions.

Recently novel compositions have been described for which saturation induction increases with increasing temperature in a temperature range below the Curie point. This effect is believed to result from a change in sign of at least one of the exchange interactions occurring in the material and the temperature at which the effect takes place has been termed the "exchange inversion temperature." Materials exhibiting such an effect are described in an article by Swoboda et al. [Physical Review Letters, 4, 509 (1960)], in applications of T. J. Swoboda, Serial No. 181,629, filed March 22, 1962, now U.S. Patent 3,126,492; Serial No. 181,744, filed March 22, 1962, now U.S. Patent 3,126,347; and Serial No. 66,194, filed October 31, 1960, now U.S. Patent 3,126,345; and in the application of T. A. Bither, Serial No. 66,195, filed October 31, 1960, now U.S. Patent 3,126,346.

By appropriate adjustment in composition of materials exhibiting an exchange inversion, the temperature range over which inversion occurs can be shifted from very low temperatures to temperatures approaching the Curie point of the composition. However, for compositions hitherto available relatively wide temperature intervals, i.e., intervals of 30° C. or more, are commonly required for the change from low to high saturation induction.

The present invention provides a method for preparing ferromagnetic compositions exhibiting a large increase in saturation induction with rise in temperature over a small temperature interval, i.e., an interval of not more than 6° C. This method consists in melting a composition which exhibits an increase in saturation induction with rise in temperature over a wide temperature interval, i.e., an interval of more than 6° C., or the ingredients requisite for the formation of such a composition, quenching the molten composition to a temperature below its solidification temperature, annealing at a higher temperature below the solidification temperature, and cooling slowly. Optionally a chalcogen reactive reagent may be added to the molten composition prior to quenching.

The accompanying drawing illustrates the magnetic behavior of products prepared by the process of this invention. These products are characterized by an exchange inversion which occurs over a temperature range of not more than 6° C. and are ferromagnetic above this exchange inversion temperature, but substantially non-magnetic at lower temperatures.

Compositions to which the process of this invention can be applied include manganese-chromium-antimony and manganese-vanadium-antimony compositions containing 53.5–91.9 atom percent Mn, 0.1–39 atom percent Cr and/or V and 8–35 atom percent Sb as well as compositions containing an additional component such as indium or gallium in an amount of 0–30 atom percent (based on the total of Mn, Cr and Sb).

Manganese-germanium-antimony compositions are another class of magnetic materials which exhibit a large increase in saturation induction over a small temperature interval after quenching and annealing as described above. These compositions contain 61–75 atom percent manganese and 25–39 atom percent of the elements antimony and germanium, the major proportion of these elements being antimony. Other compositions exhibiting a large increase in saturation induction with rise in temperature to which the process of this invention can be applied are described in the aforementioned patent applications of T. A. Bither and T. J. Swoboda.

Chalcogen reactive reagents, when employed, will be added to the compositions in an amount of not more than 5 atom percent and usually in an amount of 0.1–1 atom percent. From the discussion which follows it will become apparent that oxides or sulfides of these chalcogen reactive reagents may also be present in minor proportions in the final products of this invention.

The Periodic Table referred to herein is the one appearing in Deming's "General Chemistry," John Wiley and Sons, Inc., 5th Edition, chapter 11.

The process of this invention involves, as the initial stage, preparation of a molten composition containing the ingredients enumerated above. This composition is conveniently prepared by mixing the elements, or compounds and alloys of these elements with each other, and heating to a temperature sufficient to bring about formation of a homogeneous melt. This temperature will usually be in the range of 850–1400° C. For reasons of economy and to minimize loss of volatile constituents, it is generally desirable to hold the temperatures near the minimum required for melting the composition. For many compositions this temperature will be in the range of 900–1000° C.

Melting is preferably carried out in the absence of air. An inert atmosphere such as argon or helium may be employed to exclude air or melting may be conducted in a vacuum, or under a molten salt flux such as molten sodium chloride. Any suitable container resistant to attack by the melt may be employed. In the examples below, use of alumina and quartz containers is illustrated, but containers constructed of other high-temperature resistant materials such as magnesia are also satisfactory.

The molten composition is quenched to a temperature sufficiently low to bring about rapid solidification. This temperature will usually be below 600° C. but in the case of high melting compositions may be 800° C. or higher. Ordinarily a temperature of at least 100° C. below the temperature at which the melt solidifies will be employed. Quenching is accomplished by any convenient means, e.g., by immerison in a cold, non-reactive liquid such as liquid argon, water or oil, by exposure in a finely divided state to a blast of cold, non-reactive gas or by pouring over a cold surface or into a cold vessel, such as a copper or stainless steel vessel cooled in ice water. The composition at this stage is a polycrystalline solid characterized by an exchange inversion which occurs over a very broad temperature range (20–100° C. or more). The crystals are frequently oriented with the a-axis perpendicular to the cold surface.

After quenching, the composition is annealed by reheating to a temperature in the range between the temperature reached on quenching and the melting point of the composition and is then slowly cooled to room temperature. Annealing is continued until a product possessing the desired exchange inversion range is obtained. Normally, this requires 0.5–3 hours. However, occasionally longer times, i.e., 10–100 hours or more, may be necessary to produce the desired sharpness of transition. Annealing is usually carried out above 500° C. and the temperature range of 750–925° C. is particularly useful with Mn-Cr-In-Sb compositions. Higher temperatures can be employed with high melting compositions. It is desirable that the annealing temperature be close to but slightly below the melting point of the composition. Annealing is often carried out at a temperature within 50° C. of the melting point.

When annealing is complete, the composition is cooled slowly to room temperature. The rate of cooling will usually be such that the temperature of the composition is reduced by 10–300° C. per hour. Since extremely slow rates of cooling, when used throughout the entire cooling range, lead to excessive cooling times, it is often desirable to employ a slow cooling rate, i.e., 10–30° C. per hour at higher temperatures and to increase the rate of cooling as the temperature is lowered. For many compositions a cooling rate in the range of 15–60° C. per hour has been found adequate.

The addition of a chalcogen reactive reagent to the composition before quenching and annealing is a feature of this invention. The presence of this reagent assists in the elimination of atmospheric oxygen during the melting stage and removes any oxygen or sulfur present as impurity in the ingredients employed. Compositions prepared using a chalcogen reactive reagent in the melt, when properly quenched and annealed, exhibit sharper magnetic transitions than compositions prepared without such reagents.

Aluminum has been found to be very effective as a chalcogen reactive reactant and improves the sharpness of transition without affecting the temperature at which the transition occurs. Aluminum also eliminates the tendency for the composition to adhere to the walls of the crucible used to contain the melt with the result that the final product is readily removed from the container.

Carbon and silicon also are very effective as chalcogen reactive reactants but cause exchange inversion to occur at a lower temperature than would otherwise be the case. Although the reason for this is not completely understood, it is thought to be connected with the formation of minor amounts of carbides and silicides of the reactants. When due allowance is made for this lowering of the inversion temperature, compositions having a narrow transition range with the midpoint of the range falling at a desired temperature can be prepared readily using carbon or silicon as chalcogen reactive reactants.

Other chalcogen reactive reactants which can be employed are magnesium, calcium, sodium, lithium, calcium hydride and titanium hydride. Of these, reactants such as sodium, lithium or magnesium which are themselves volatile or form volatile reactant products, are preferred.

The proportion of chalcogen reactive reagent added to the melt is based on the impurity content of the melt ingredients. Normally a quantity of reagent is employed which is approximately stoichiometrically equivalent to the chalcogen to be removed. Since manganese is the principal source of chalcogen in the melt, the chalcogen content of the manganese employed can be used as a convenient basis for determining the proportion of chalcogen reactive reagent to be introduced. Of course, if desired, the chalcogen content of the entire melt can be determined and the proportion of chalcogen reactive reagent based thereon. Usually, from 0.5–2.5 stoichiometric equivalents of reagent based on oxygen impurity are employed.

As described above, saturation induction of the compositions prepared by the process of this invention increases sharply with increasing temperature over a temperature range of not more than 6° C. This type of relationship between saturation induction and temperature is illustrated in the accompanying drawing. The drawing also shows the manner of determining numerical values used herein to describe the relationship. The transition temperature is the temperature at which induction is equal to one-half the sum of the inductions at the points (A) and (B) in the drawing, i.e., at the mid-point of the curve. The temperature interval over which 80% of the transition occurs is referred to as the transition range. The range for 80% of the transition is used instead of that for the entire exchange inversion to avoid uncertainties associated with the very gradual changes occurring near the extremes of the inversion. For convenience, the transition range can be determined in fields insufficient to saturate the sample since this range is little affected by field strength, and fields of 100–1000 oersteds are often employed.

Saturation induction is defined on pages 7 and 8 of Bozorth's "Ferromagnetism," Van Nostrand Co., Inc., New York (1951), and is conveniently measured in terms of the induction per gram or sigma value, $\sigma_s$. The sigma values herein are determined in a field of 16,750 oersteds using the Faraday-Curie method (Bozorth, ibid., pp. 858–859).

The process of this invention is illustrated in greater detail in the examples which follow.

EXAMPLE I

A. A mixture of manganese, chromium, antimony and indium in the proportions in atom percent, 63.7% Mn, 3.3% Cr, 31.3% Sb and 1.7% In, was placed in a crucible of recrystallized alumina which was then inserted in a quartz envelope. The envelope was alternately evacuated to a pressure of 0.1 mm. of mercury and repressured with purified argon while the mixture was heated to 400° C. Heating and alternate evacuation and repressuring were continued for 2 hours. At the end of this period, purified argon was introduced and the mixture was melted by heating to 960° C. under an argon pressure slightly in excess of atmospheric pressure (1.1–1.2 atm.). After heating for 14 hours, the whole assembly, i.e., quartz envelope and alumina crucible containing the molten mixture, was plunged into ice water thereby quenching the mixture and causing it to solidify.

The solidified mixture still contained in the alumina crucible within the quartz envelope was next annealed by heating at 850° C. for one hour in an atmosphere of purified argon. The annealed solid was slowly cooled at 20° C./hr. to 750° C., further at 50° C./hr. to 650° C., and finally to room temperature at an average rate of about 275° C./hr. The product exhibited an exchange inversion at 34.6° C. (mid-point of the transition) and a transition range (for 80% of the transition) of 5.0° C. At temperatures substantially below the inversion temperature, the product was non-magnetic. This product exhibited a maximum saturation induction of 22.4 gauss cm.$^3$/g.

B. In a similar manner, a composition was prepared containing manganese, chromium, antimony and indium in the following proportions (in atom percent): 64.62% Mn, 1.88% Cr, 31.82% Sb, and 1.68% In. After melting and quenching under purified argon, as described above, the quenched solid was annealed for 2.5 hours at a temperature of 840° C. and thereafter cooled to room temperature. During cooling, a temperature of 635° C. was reached after 40 minutes, a temperature of 445° C. after the next hour and room temperature was attained after about 12 hours. The product exhibited an exchange inversion temperature of −40.7° C. and an inversion range of 4.2° C.

C. In like manner a composition containing 65.89% Mn, 0.88% Cr, 31.57% Sb, and 1.66% In was prepared, quenched, annealed for 1 hour at 845° C. and cooled at a rate of 30° C. per hour. The composition exhibited an exchange inversion temperature of −132° C. and a transition range of 4.7° C.

EXAMPLE II

A composition with a transition range broader than 6° C. containing manganese, vanadium, antimony and indium in the proportions in atom percent 64.98% Mn, 1.69% V, 31.66% Sb, and 1.68% In was prepared by outgassing the mixture of the powdered elements in the desired proportions of 0.1 micron pressure and 400° C., heating under purified argon at 980–1000° C. for 14 hours and cooling to room temperature at rate of 30° C./hour. This composition had an exchange-inversion range of 59° C. with a mid-point at −125° C. The composition was remelted by heating to 1100° C. under purified argon and poured into a copper mold cooled in ice water. The quenched product was annealed for 1 hour at 850° C. and cooled at a rate of 30° C. per hour to room temperature. This product exhibited an exchange inversion at −92° C. and a transition range (for 80% of the transition) of 4.3° C.

Another composition containing in atom percent 65.82% Mn, 0.86% V, 31.65% Sb, and 1.67% In had an exchange inversion at −144.5° C. with a range (for 80% transition) of 2.0° C.

EXAMPLES III–V

These examples illustrate the use of aluminum as a representative chalcogen reactive reagent in carrying out the process of this invention. The general procedure was as described in Example I. The aluminum was added as in the form of aluminum foil to the initial mixtures and all melts were quenched into ice-water. Proportions of chalcogen reactive reagent annealing conditions and exchange inversion characteristics of the products are summarized in Table I. After annealing, the products were cooled at an initial rate of 30° C. per hour to 650° C. and thereafter more rapidly so that a temperature of 580–585° C. was attained after 20 minutes and a temperature of 400–425° C. after 1.33 hours. It will be noted that the amount of aluminum added was approximately stoichiometrically equivalent to the oxygen present in the electrolytic manganese used. Use of excess aluminum over the stoichiometric amount results in an increase in residual magnetization at temperatures below the exchange inversion temperature.

*Table I—Preparation of compositions with aluminum* [1]

| Example No. | Aluminum (Atom Percent) [2] | Annealing Conditions | | Exchange Inversion | |
|---|---|---|---|---|---|
| | | Temp. (° C.) | Time (hrs.) | Midpoint (° C.) | Range (° C.) [3] |
| III | 0.43 | 840 | 1 | 26.9 | 3.5 |
| IV | 0.46 | 760 | 1 | 27.6 | 4.1 |
| V [4] | 0.33 | 850 | 1 | 31.2 | 2.0 |
| A | 0.43 | Not annealed | | 32.6 | 23.8 |

[1] The compositions contained (in atom percent) 63.10–64.12 Mn; 3.30–3.60 Cr; 30.94–31.94 Sb; 1.65–1.67 In. These values refer to the aluminum-free compositions.
[2] Based on total of Mn, Cr, Sb, and In; Al stoichiometrically required for reaction with oxygen present in Mn used is 0.43 atom percent.
[3] For 80% inversion. The compositions of Examples III–V were non-magnetic at temperatures substantially below the exchange inversion temperature.
[4] This product had a maximum sigma value of 22.4 gauss cm.³/g. A similar composition containing 0.35 Al, quenched and annealed as described in Example V was quenched in ice-water after annealing. The product showed an exchange inversion range of 22.8° C.
Note: Use of carbon (2.12 atom percent) as chalcogen reactive reactant gave a composition with an exchange inversion range of 3.3° C., but the inversion midpoint was shifted to −14.6° C. Similarly, silicon (0.27 atom percent) caused a shift to −7.8° C. No shift of the exchange inversion temperature was observed with other chalcogen reactive reactants, i.e., sodium (2 atom percent), calcium hydride (0.1 mole percent), calcium (0.8 atom percent), or magnesium (0.4 atom percent).

EXAMPLE VI

This example illustrates the preparation of ternary manganese-chromium-antimony compositions exhibiting a large increase in saturation induction with rise in temperature over a small temperature interval. A composition containing the three elements in the proportions of 64.01 atom percent Mn, 2.67 atom percent Cr, and 33.33 atom percent Sb was outgassed at 0.1 micron pressure at 400° C. and melted by heating at 1100° C. under purified argon. The hot liquid melt was quenched by pouring into a copper container cooled in ice water. Separate portions of the quenched product were annealed at 875° C. for 2.5 hours and 28 hours, respectively, and then cooled at a rate of 30° C. per hour to room temperature. The properties of the products are given in Table II.

*Table II—Ternary compositions containing Mn, Cr, and Sb*

| Example No. | Annealing Time (Hours) | Exchange Midpoint (° C.) | Inversion Range (° C.) [1] |
|---|---|---|---|
| VI-A | 2.5 | 2.7 | 6.0 |
| VI-B | 28 | 2.5 | 5.9 |

[1] For 80% inversion.

By virtue of the large change in saturation induction occurring over a small temperature interval, compositions prepared according to the process of this invention are particularly useful in various applications, e.g., in thermomagnetic generators which produce large outputs as a result of small variations in temperature. Since, as is known, exchange inversion in these compositions is a first order transition, the sharp inversion compositions prepared according to this invention have outstanding utility in fabrication of magnetic heat pumps and refrigerators. The sharp inversion feature is also useful in various types of control equipment, e.g., switches, thermosensitive inductors, clutches, and the like in which sensitivity to small changes in temperature is desired.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A method for preparing ferromagnetic compositions exhibiting a large increase in saturation induction with rise in temperature over a temperature interval of not more than 6% C. which comprises (1) melting a composition consisting essentially of 53.5–91.9 atom percent of maganese, 8–35 atom percent of antimony, 0.1–39 atom percent of a transition element selected from the class consisting of chromium, vanadium, germanium, iron, cobalt, nickel, copper, niobium, molybdenum, tantalum, tungsten and rhenium, and from zero up to and including 30 atom percent of at least one element selected from the group consisting of gallium, indium, arsenic, bismuth, cadmium, lead, selenium, tellurium, thallium, tin, zirconium, scandium, yttrium, magnesium and zinc, (2) quenching the molten composition to a temperature at least 100° C. below its solidification temperature, (3) annealing the resulting polycrystalline composition at a temperature above 500° C., and (4) cooling the annealed composition at a rate of 10–300° C. per hour.

2. Method of claim 1 in which the composition exhibiting an increase in saturation with rise in temperature is prepared in situ by mixing ingredients requisite for formation of such composition and heating said ingredients to produce a homogeneous melt.

3. Method of claim 1 in which melting is effected in the absence of air.

4. Method of claim 1 in which a chalcogen reactive reagent is added to the molten composition prior to quenching in an amount effective to remove any oxygen and sulfur present as impurities.

5. The method of claim 4 in which the chalcogen reactive reagent is aluminum.

6. The method of claim 1 wherein the composition which is melted consists essentially of 53.5–91.9 atom percent of manganese, 8–35 atom percent of antimony, 0.1–39 atom percent of chromium, and up to 30 atom percent of indium.

7. A composition consisting essentially of 53.5–91.9 atom percent of manganese, 8–35 percent of antimony, 0.1–39 atom percent of transition element selected from the class consisting of chromium, vanadium, germanium, iron, cobalt, nickel, copper, niobium, molybdenum, tantalum, tungsten and rhenium, and from zero up to and including 30 atom percent of at least one element selected from the group consisting of gallium, indium, arsenic, bismuth, cadmium, lead, selenium, tellurium, thallium, tin, zirconium, scandium, yttrium, magnesium and zinc, said composition being characterized by an exchange inversion which occurs over a temperature range of not more than 6° C. and by being ferromagnetic above the exchange inversion temperature.

8. A composition of claim 7 which consists essentially of 53.5–91.9 atom percent of manganese, 8–35 atom percent of antimony, 0.1–39 atom percent of chromium, and up to 30 atom percent of indium.

9. A composition of claim 7 which consists essentially of 53.5–91.9 atom percent of manganese, 8–35 atom percent of antimony, and 0.1–39 atom percent of chromium.

10. A composition of claim 7 which consists essentially of 53.5–91.9 atom percent of manganese, 8–35 atom percent of antimony, 0.1–39 atom percent of vanadium, and up to 30 atom percent of indium.

References Cited by the Examiner

UNITED STATES PATENTS

| | | | |
|---|---|---|---|
| 2,250,470 | 7/41 | Dean | 75—134.9 |
| 2,310,094 | 2/43 | Kroll | 75—134.9 |
| 2,830,922 | 4/58 | Ahles | 148—121 |
| 2,980,563 | 4/61 | Pavlovic | 148—121 |

OTHER REFERENCES

Ferromagnetism, Bozorth, published by D. Van Nostrand Company Inc., N.Y., 1951, pages 19–29.

Swoboda et al., "Evidence for an Antiferromagnetic Transition in Cr-Modified $Mn_2Sb$," Physical Review Letters, vol. 4, No. 10, May 15, 1960, pages 509–511.

Constitution of Binary Alloys, Hansen, McGraw-Hill Publishing Company, New York, 1958, pages 950–952.

DAVID L. RECK, *Primary Examiner.*

RAY K. WINDHAM, *Examiner.*